United States Patent Office 3,059,434
Patented Oct. 23, 1962

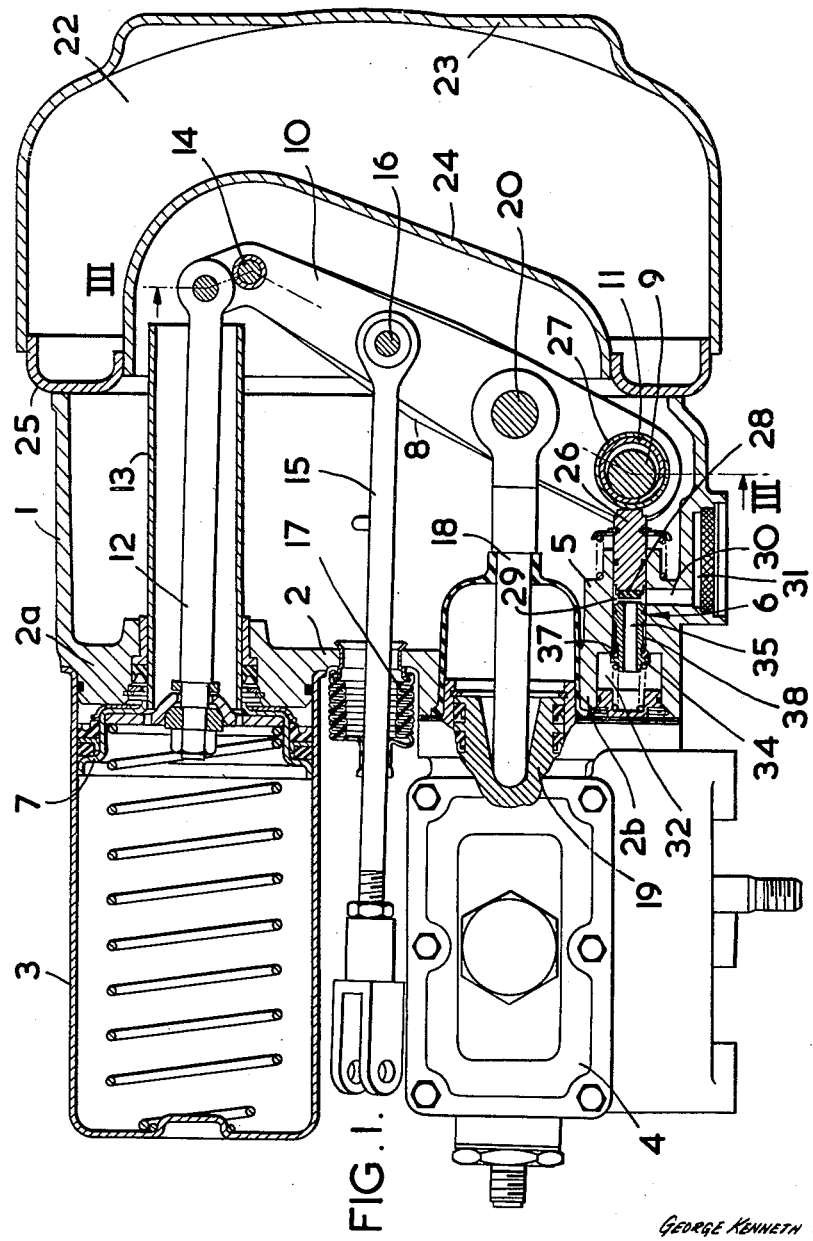

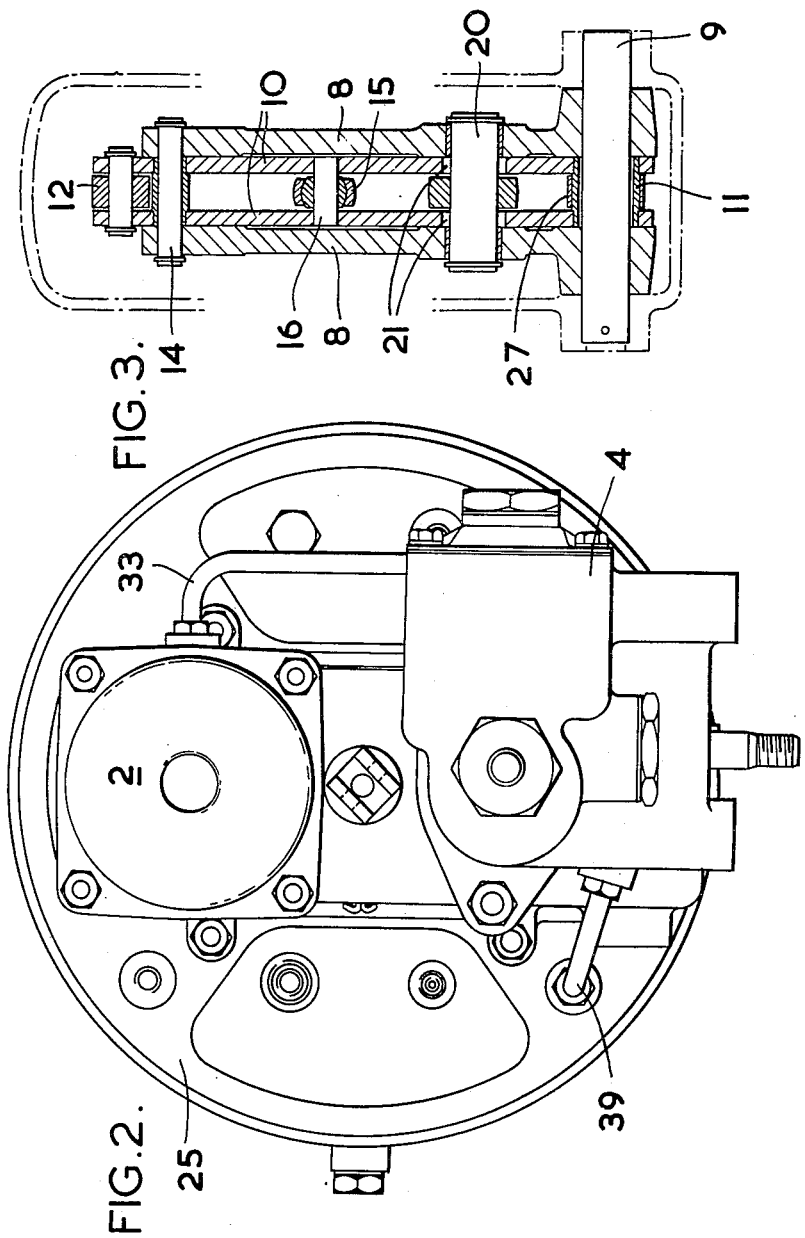

3,059,434
FLUID PRESSURE OPERATED SERVO BRAKING MECHANISMS
George K. Farmery, Scothern, Lincoln, and Wilbur M. Page, Lincoln, England, assignors to Clayton Dewandre Company Limited, Lincoln, England
Filed Mar. 7, 1960, Ser. No. 13,148
5 Claims. (Cl. 60—54.6)

This invention relates to fluid pressure operated servo braking mechanisms and to the kind in which the effort applied to the driver's brake pedal is transmitted mechanically to a lever assembly connected to an air pressure, piston and cylinder type, servo device and to a valve controlling operation of said device, the lever assembly being operable to transmit the manual effort and the output of the servo device to the master cylinder of a hydraulic system which in turn transmits the braking effort to the wheel brakes, and said lever assembly also reacting through the mechanical transmission on the brake pedal.

In such mechanisms it is well known to mount the servo motor and the hydraulic master cylinder on an end wall of the lever housing but the accommodation of the unit and of the associated compressed air reservoir in the space available on a vehicle chassis is not easily effected and it is an object of the present invention to provide an improved mechanism of compact construction which simplifies production, installation and servicing.

According to the invention the improved mechanism comprises a lever housing, an oscillatable brake and reaction lever assembly extending transversely across said housing, a servo motor and a hydraulic master cylinder disposed at one end of the lever housing, operative connections between the lever assembly and the pistons of the servo motor and the master cylinder, and an air reservoir mounted upon or formed integral with the other end of the lever housing to form a unitary structure therewith.

In the preferred construction, the reservoir is so shaped that it can accommodate at least part of the lever assembly and associated transmission gear in one limit position, so reducing the overall length of the mechanism whilst maintaining a substantial reservoir capacity, and these and other features of the improved mechanism will be referred to in more detail in the following description of one embodiment of the invention made with reference to the accompanying drawings wherein FIG. 1 is a sectional plan view of the mechanism,
FIG. 2 is an end view of FIG. 1, and
FIG. 3 is a cross section through the lever assembly taken on the line III—III of FIG. 1.

As shown, the lever housing 1 in the form of a casting embodies one end wall 2 upon which are supported the servo cylinder 3 and the hydraulic cylinder 4, the opposite end of the casting being left open for a purpose to be described later. The casting also incorporates the housing 5 of the control valve, indicated generally at 6, which is located on the diametrically opposite side of the end wall to the servo cylinder.

The servo motor is of conventional form, the cylinder, closed at its outer end, being secured on a spigot-like extension 2a of the casting and the piston 7 being spring-urged towards the inner end of the cylinder. The master cylinder 4 may be of any suitable type and is bolted or otherwise secured to a tubular boss 2b on the casting.

The brake and reaction lever assembly, which is of known type, lies transversely across the housing, the brake levers 8 being pivotally mounted at one end on a fixed pin 9 whilst the reaction levers 10 are fixed to a sleeve 11 encircling the pin 9 with a clearance such that the reaction levers are capable of pivotal movement as well as limited lateral displacement upon said pin. The opposite ends of the reaction levers are connected by a pull rod 12 to the servo piston 7, the rod having pivotal connection with said piston and levers, and in order to seal the aperture in the housing end wall 2 through which the rod extends, the piston is provided with a tubular extension 13 which has a sealed sliding fit in said aperture and is of sufficient length to maintain sliding engagement in the end wall over the full stroke of the servo piston. The brake and reaction levers are pivotally interconnected by a pin 14 at a short distance from the rod connection to the servo piston whilst disposed between the servo and master cylinders is a pedal-actuated pull rod 15 which is connected to the reaction levers by a pivot pin 16, the aperture in end wall 2 through which rod 15 extends being closed by a bellows type seal or grummet 17. Nearer to the fixed pivot 9, the brake levers have pivotal connection with a push rod 18 which actuates the piston 19 of the master cylinder, the pivot pin 20 passing with clearance through openings 21 in the reaction levers.

Bolted or otherwise fixed to the other end of the lever housing is an air reservoir 22 which forms a closure to that end of the housing. In order to keep the overall length of the assembly as small as possible, a lever housing of minimum length is used, commensurate with the need to provide a support for the fixed pivot pin 9, the lever assembly and the tubular extension 13 on the servo piston extending through the open end of the casting 1 in one limit position and the reservoir being appropriately shaped to accommodate them. Thus, for example, the reservoir may be constructed of two dished pressings 23, 24 welded to an end wall 25 so providing substantial capacity and clearance for the lever assembly whilst keeping the axial length of the reservoir relatively small. In this manner, there is obtained a combined reservoir and servo braking unit which is only slightly longer than the normal servo braking unit alone so providing a valuable saving of space required for installation.

Alternatively, the reservoir may be formed integrally with the lever housing or with the side walls thereof, a suitably-shaped dividing wall being provided for separating the reservoir section from the lever housing section.

The valve 6 controls flow of compressed air from the reservoir to the servo cylinder and also the exhausting of air from said cylinder. As shown, the valve comprises a thrust member 26 guided for axial sliding movement in a bore in the housing 5 and spring urged at its outer end into abutment with a roller 27 encircling the sleeve 11. The inner end of thrust member 26 is rubber faced to form a valve seat 28 and extends into a chamber 29 connected to atmosphere by way of a passage 30 and a port 31 preferably fitted with an air filter. A further chamber 32 is connected to the inner end of the servo cylinder by a conduit 33 and is separated from the chamber 29 by a spring-loaded air valve 34 disposed coaxially of the thrust member 26. The air valve 34 has an axial passage 35 and co-operates at its inner end with the valve seat 28, the other end of said air valve incorporating a rubber annulus 36 co-operating with a fixed seating 37. The air valve is also grooved peripherally to define with housing 5 an annular chamber 38 which is connected by a conduit 39 to the reservoir. In the "brakes off" position, the thrust member 26 is spaced slightly from the air valve 34 so that the servo cylinder is connected to exhaust by way of conduit 33, chamber 32, the passage 35 in the air valve, chamber 29, passage 30 and port 31. Displacement of the pull rod 15 by actuation of the brake pedal first rocks the lever assembly clockwise, moving the thrust member inwards so that it abuts the air valve and closes the exhaust or atmospheric connection. Under continued movement, the air valve is lifted away from the seating 37 so connecting the servo cylinder to the reservoir, the resultant displacement of the servo piston swinging the lever assembly about the pivot pin 9 to actuate the master cylinder. The levers also act in known manner to exert through the pull rod 15 a reaction proportional to the force exerted by the servo motor whilst also being operable to transmit manual effort from said pull rod to the master cylinder in the event of failure of the compressed air supply.

We claim:

1. A fluid pressure operated servo braking mechanism comprising a main housing having a wall at one end, a brake and reaction lever assembly extending across said housing, mounting means supporting said assembly for pivotal movement between positions in which said assembly is received in said housing and in which a portion of said assembly projects beyond the other end of said housing, a servo motor and a hydraulic master cylinder mounted on said wall and extending externally of said housing, means operatively connecting said lever assembly and said servo motor and said master cylinder, and an air reservoir assembly rigid with the opposite end of said housing to form a closure therefor, the side of said air reservoir adjacent said main housing being recessed to accommodate said projecting portion of said lever assembly.

2. The mechanism according to claim 1 wherein said mounting means supports said lever assembly at one end for pivotal movement and for limited lateral displacement together with a thrust rod connecting the piston of said master cylinder to said lever assembly, a first pull rod connecting the piston of said servo motor to said lever assembly and a second pull rod connected to said lever assembly and extending longitudinally through an opening in said wall and adapted to be connected to a brake pedal.

3. The braking mechanism according to claim 2 together with a tubular extension on the piston of said servo motor mounted for sliding movement in said opening, and a sealing structure in said opening sealingly engaging said extension.

4. The mechanism according to claim 2 together with a control valve for said servo motor mounted in said housing and means for actuating said control valve upon lateral displacement of the lever mechanism.

5. A brake mechanism as claimed in claim 4, wherein said control valve includes a housing defining a chamber connected to atmosphere, a spring-loaded thrust member displaceable in said chamber by abutment with the lever mechanism, a further chamber connected to the servo motor, and a tubular air valve normally interconnecting said chambers and disposed coaxially of the thrust member, the arrangement being such that displacement of the thrust member brings a seating thereon into engagement with one end of the air valve to seal off the atmospheric connection and thereafter moves the said valve to establish communication between the chamber connected to the servo motor and an annular chamber surrounding the air valve and connected to the reservoir.

References Cited in the file of this patent

UNITED STATES PATENTS

| | | |
|---|---|---|
| 2,805,550 | Ayers | Sept. 10, 1957 |
| 2,808,705 | Ingres | Oct. 8, 1957 |
| 2,910,048 | Ingres | Oct. 27, 1959 |
| 2,934,042 | Stelzer | Apr. 26, 1960 |

FOREIGN PATENTS

| | | |
|---|---|---|
| 467,688 | Great Britain | June 22, 1937 |
| 707,232 | Great Britain | Apr. 14, 1954 |